Oct. 12, 1943.   W. I. SENGER   2,331,733
UNBALANCE CORRECTION METHOD AND MACHINE
Filed Dec. 20, 1940   3 Sheets-Sheet 1

INVENTOR
BY *Werner Irving Senger*
*Fred G. Parsons*
ATTORNEY

Oct. 12, 1943.     W. I. SENGER     2,331,733
UNBALANCE CORRECTION METHOD AND MACHINE
Filed Dec. 20, 1940     3 Sheets-Sheet 2

Fig. 3.

INVENTOR
BY Werner Irving Senger
Fred A. Parsons
ATTORNEY

Oct. 12, 1943.　　　W. I. SENGER　　　2,331,733
UNBALANCE CORRECTION METHOD AND MACHINE
Filed Dec. 20, 1940　　　3 Sheets-Sheet 3

Fig. 4.

INVENTOR

Patented Oct. 12, 1943

2,331,733

UNITED STATES PATENT OFFICE 2,331,733

UNBALANCE CORRECTION METHOD AND MACHINE

Werner Irving Senger, Madison, Wis., assignor to Gisholt Machine Company, Madison, Wis., a corporation of Wisconsin Application December 20, 1940, Serial No. 370,952

16 Claims. (Cl. 77—5)

This invention relates to a machine for correction of unbalance about the intended axis of rotation of work pieces, and particularly for crankshafts and the like.

The invention is, in a number of particulars, a continuation, extension and improvement of the invention of a copending application Serial No. 176,177, filed November 24, 1937, now issued Patent No. 2,243,379.

A purpose of the invention is to provide an improved balancing machine having portions adjustable in accordance with unbalance present in the work piece, and other portions which are adjusted or controlled in accordance with the adjustment of the first mentioned portions, for correction of the unbalance.

A further purpose is to provide an unbalance correction method and machine operative in a manner which makes it unnecessary either to determine as a part of the correction operation the particular angular point at which the unbalance operates or to initially provide the work with an unbalance operating in a predetermined angular location.

A further purpose is to provide a method and machine such as just mentioned in a form particularly adapted for effecting unbalance corrections in each of a plurality of axially spaced correction planes in a manner to correct both the static and dynamic unbalance of the work piece.

A further purpose is generally to simplify and improve balancing methods and the construction, organization and operation of balancing machines, and particularly respecting one or more of the purposes previously mentioned. Still other purposes will be apparent from this specification.

The invention includes the methods, constructions, and combinations of parts illustrated, described and claimed herein, and includes such modifications as may be equivalent to the claims, various such modifications being contemplated.

The same reference characters have been used to designate the same parts throughout, and in the drawings.

In the copending application referred to there is shown a structure and method whereby measurement or determination of the exact angle of an unbalance about the intended axis of a work piece is unnecessary to the correction of the unbalance, provided the work piece is initially biased for the unbalance to be located between certain angular limits. In the machine of the present invention it is not necessary to determine the angular position of the unbalance for correction thereof, and neither is it necessary to provide an initial bias, as will appear.

Figures 1, 2:
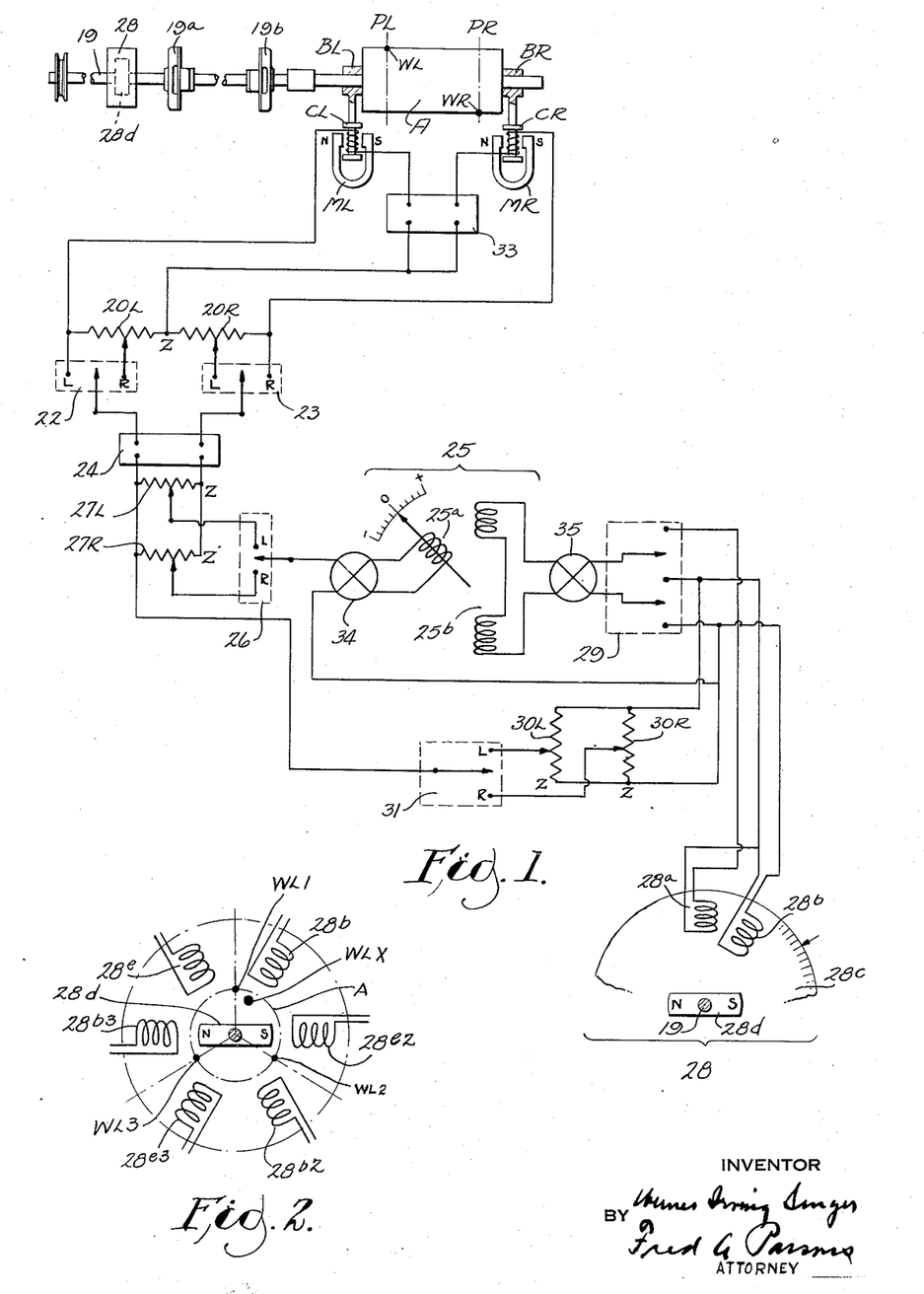
Figure 1 is a diagrammatic representation of a simplified unbalance measuring device used in practice of the invention.
Figure 2 is a diagrammatic representation of an unbalance measuring generator which may be substituted for purposes of the invention in the arrangement of Fig. 1.

Referring to the diagram Fig. 1: A work piece A has an intended rotation axis determined by aligned left and right work bearings BL, BR. If the axial length between the bearings is short relative to the work diameter balance may usually be effected, particularly for rigid work pieces, by so-called static unbalance correction at one point on the work periphery. Such static balancing is, however, usually unsatisfactory for long work, particularly for parts intended for high rotative speeds, because correction at one point does not correct any centrifugal force couples acting to distort the work about its axis, such couples operating to vibrate the work and bearings even where the work is in static balance. To eliminate centrifugal force couples it is necessary to effect the unbalance correction in at least two axially spaced correction planes such as the planes PL, PR, Fig. 1. The correction planes may be substantially arbitrarily selected to suit the form of the work piece, etc., but the amount of correction material to be added, or subtracted if preferred, in any particular correction plane obviously will be, in part, dependent on the axial location of the plane relative to the bearings.

In Fig. 1 corrections such as WL, WR, respectively in planes PL, PR, represent material added or subtracted to balance the work piece A for so-called static unbalance, and also to eliminate any centrifugal force couples set up during work rotation. For convenience of description, however, WL, WR will sometimes be referred to as representing the equivalent unbalances which the corrections are intended to remedy. It is to be noted that, although the device herein described mostly refers to removal of material for correction of unbalance it is not intended that the invention should be limited to such method of correction, balancing by either addition or subtraction being well understood in the art.

The bearings BL, BR are mounted to permit independent vibratory movement or oscillation limited to one of the axial planes of the work piece, preferably the horizontal plane, the bearings being urged, as by suitable springs, not shown, to a normal central position of mutual axial alignment. In order to permit free oscillation the work piece rotation from a shaft such as 19 is through suitable coupling members such as 19a, 19b. Whenever an unbalanced work piece is rotated in such bearings, each bearing will have a vibratory movement caused by the centrifugal force of the unbalances and comprising two components respectively due to the unbalances WL and WR. Thus the vibration of bearing BL will have a main component for which the amplitude is determined by the amount of the nearest adjacent unbalance WL and a lesser component determined by the amount of the more remote unbalance WR, and similarly for the bearing BR.

Pick-up coils such as CL, CR are respectively associated with the different bearings to be vibrated by the bearings in the field of permanent magnets ML, MR, each coil generating an alternating current of value proportional to the amplitude of its vibration. The different pick-up coil circuits respectively include potentiometers 20L, 20R, with which are associated switches 22, 23 having contact pairs L, L and R, R respectively for connection of the left and right end pick-up coils to an amplifier device 24, which may be of any suitable well-known thermionic tube type, for example.

The output of amplifier device 24 is connectible to a movable coil 25a of a wattmeter 25, alternatively by the means of a switch 26 through calibrating potentiometers 27L or 27R used for calibrating the wattmeter readings obtained respectively during connection of the left end and right end pick-up coils, as later described. The wattmeter stationary coil 25b is supplied with current from either of angularly spaced coils 28a, 28b of a measuring generator 28, alternatively connected according to the position of a switch 29, the coils being arranged for a magnet 28d, which is fixed to revolve with the drive shaft 19, to generate a cycle of alternating current in each coil at each revolution of work piece A.

The measuring generator coils 28a, 28b are in fixed angular relation to one another but in the device of Fig. 1 are unitarily angularly adjustable with a frame 28c, whereby to change the phase relationship between the measuring generator coil currents and the pick-up coil currents. One of the generator coils provides current for measuring potentiometers 30L, 30R which may be alternatively included in the circuit of the movable wattmeter coil 25a according to the position of a switch 31.

The device of Fig. 1 may be utilized to determine the angular position and amount of the unbalances WL, WR, but for such purposes it is desirable to eliminate from the circuit of each pick-up coil CL, CR the effect of any unbalance referred for correction to the other coil, as for example to eliminate from the circuit of coil CL the effect of the component of oscillation of bearing BL which is caused by the unbalance WR, as previously referred to.

Assuming that there is available a perfectly balanced work piece A, the device of Fig. 1 may readily be adjusted for such elimination, as follows: To eliminate in the circuit of pick-up coil CL the effect of any unbalance referred for correction to plane PR, an artificial unbalance WR is attached to the perfectly balanced work piece in the correction plane PR, in which position it will cause vibration of both the bearings BL and BR, these vibrations being 180° out of phase and of greatest amplitude in the nearest adjacent bearing BR. The switches 22, 23, 26, 31 are each set to the L position, where the coil 25a of the wattmeter is supplied with amplified current proportional to the current in the circuit of pick-up coil CL. The various potentiometers 20L, 20R, 27L, 27R, 30L, 30R are each set to the zero position Z where they are of no effect, and the switch 29 is set to supply current to wattmeter coil 25b from coil 28a of the generator. The generator frame 28c is then angularly adjusted until the reading of the wattmeter 26 is zero, in which position the current of generator coil 28a is 180° out of phase with the current supplied to the movable wattmeter coil from pick-up coil CL, but if the switch 29 is now adjusted to connect the coil 28b instead of coil 28a the wattmeter will be deflected, the currents in the stationary and movable wattmeter coils being no longer 180° out of phase. As stated, the artificial unbalance at WR has greatest vibration effect on bearing BR, such effect being 180° out of phase with the effect in bearing BL and, if the potentiometer 20R is now adjusted from zero position to include a portion of the current from pick-up coil CR in the circuit of coil CL, a position of such adjustment will be found where the current in coil CL is exactly nullified by the current of coil CR, as indicated by a decrease to zero in the reading of the wattmeter. The position of potentiometer 20R thus found will at all times elminiate in coil CL the effect of any unbalance referred for correction to the plane PR, so long as the relative axial positions of the correction plane and bearings remain the same.

The artificial unbalance WR being removed, and an artificial unbalance WL being attached to the perfectly balanced work piece in the plane PL, the potentiometer 20L may be similarly adjusted to at all times eliminate in the circuit of pick-up coil CR the effect of any unbalance referred for correction to the plane PL, it being understood that the various switches are adjusted to the R position for this operation.

Having adjusted the device of Fig. 1, as described, for the wattmeter response to be independent of the unbalance WR when the characteristics of the unbalance WL are being determined, and vice versa, the wattmeter may now be calibrated for its readings to represent known increments of the correction required at the points WL and WR respectively, as follows: An artificial unbalance WL of known value is added to the perfectly balanced work piece in the correction plane PL. Then with the switches set in L position for wattmeter response to the unbalance WL, and generator coil 28a connected to the wattmeter the angular generator position is found where the wattmeter reading is zero. The switch 29 is now adjusted to connect the coil 28b to supply the wattmeter. Then, by adjustment of potentiometer 27L from its zero position Z the wattmeter reading for the known value of WL may be adjusted as desired and the wattmeter scale may be graduated accordingly, to read directly in inch-ounces for example. For any calibration or graduation of the wattmeter established in such manner for one of the unbalance correction planes PL or PR the other potentiometer 27R or 27L may be similarly adjusted for such calibration to correspond for both correction planes.

For the device of Fig. 1 a suitable mark or configuration on the work piece may be used to position the work in predetermined angular position relative to the generator magnet 28d, and suitable angular graduations provided to indicate angular adjustment of the generator housing 28c. To determine the zero position of the housing an artificial unbalance may be attached to a perfectly balanced work piece in the same axial plane as the marking or configuration on the work piece, and the position of the housing at the time when the zero wattmeter reading is obtained, as described, with the generator coil 28a connected to supply the wattmeter, will be the zero housing position, and the generator scale can then be graduated to indicate, for subsequent unbalance measurements, the angle of the unbalance relative to the work piece marking or configuration, whereby to locate the point on the work piece where the unbalance correction is to be made.

In the described adjustment and calibration of the device of Fig. 1 it was assumed that a perfectly balanced work piece was used. The adjustment and calibration may be similarly effected while using an unbalanced work piece, but it is then necessary, as a first step, to eliminate in the circuits of pick-up coils CL and CR the effect of the unbalance of the work piece, whereby it operates for adjustment and calibration purposes as though it were perfectly balanced. This is readily done by the use of a compensating generator device indicated at 33, but since the construction and use of such a device is fully described in the copending application previously mentioned it will not here be described.

The measuring potentiometers 30L and 30R were assumed for previously described operations to be in zero position Z, where they are of no effect. If the potentiometers are respectively adjusted out of their Z position during measurement of the unbalances PL, PR, a position of such adjustment will be found where the wattmeter reading indicating the amount of unbalance is reduced to zero and the amount of such adjustment required to effect the zero wattmeter reading is proportional to the amount of the unbalance. The various positions of the measuring potentiometers required to effect such zero wattmeter readings may be graduated to read in correction units similarly to the wattmeter. Adjustment of potentiometers such as 30L, 30R to determine the amount of unbalance correction required is of advantage where it is desired to adjust supplemental devices, such as a correction device, in accordance with the unbalance determination, or when it is desired to preserve a record of the amount of one unbalance while proceeding with the measurement of another unbalance, as will appear.

If there is provided in the generator 28, Fig. 1, another measuring coil, similar to the coil 28b but oppositely angularly spaced from the coil 28a, either coil 28b or the oppositely angular coil might be used to measure the amount of unbalance in the manner described there being suitable switch means such for example as later described for coils A1—6, B1—6 of Fig. 3, for selective connection of either coil to the stationary coil of the wattmeter. The effective dimensions and angular position of the added coil may be such that the wattmeter calibration potentiometers 27L, 27R are effective alike for both the measuring coils or other expedients might be used to effect like readings as, for example, adjustment of calibration potentiometers 27L, 27R to predetermined positions respectively for the different coils, or providing additional calibration potentiometers permanently adjusted and suitable selector switches for rendering the respective potentiometers operative only while the corresponding measuring coil is in use.

A plurality of coil pairs such as just described may be angularly arranged in a modified measuring generator such as shown in Fig. 2, where there are three such coil pairs arranged in equi-angular spacing for measurement of amount of unbalance. With such arrangement of measuring coils, correction of unbalances such as WL, WR may be effected without determining the angular position of the unbalances, as will be explained.

Thus, assuming a correction of unbalance is to be made in the correction plane PL, Fig. 1, and that the generator 28 has three pairs of measuring coils as in Fig. 2. Further, that correction may be made at any of three equi-angularly spaced correction points such as WL1, WL2, WL3, Fig. 2. The unbalance may then be in any angular position in the plane PL, but suitable measuring operations with a circuit such as in Fig. 1, using a generator 28 modified as in Fig. 2, will determine where the corrections are to be made, and the amount thereof. For this operation, as before, it is assumed that the work piece A is fixed for revolution with shaft 19 in a known angular relationship to the generator magnet 28d. For preliminary explanation let it be assumed that the unbalance is located in the same axial plane of the work piece as the correction point WL1 and that the generator of Fig. 2 has been angularly adjusted, as by use of the coil 28a, to obtain a zero reading of wattmeter 25, as was previously described for locating the angular position of an unbalance. Under such conditions either coil 28d or 28e of Fig. 2 may be used for determining the amount of the unbalance WL, as before. Similarly, for a work piece having an unbalance angularly corresponding to the correction points WL2 or WL3, the respective corresponding coil pairs 28b2, 28e2 or 28b3, 28e3 might be used for measuring the amount of correction required, and without change in the previously adjusted angular position of the generator, since in each instance the vibration set up in pick-up coil CL will have the same angular relation to the generator magnet passing the coil pair used for measurement.

Moreover, in operations such as just described, suitable reversing switches such as 34 or 35, Fig. 1, may have individual or collective adjustments to effect like readings, such as + for example, of the wattmeter 25 during measurement of any unbalances such as WL, WL2, WL3 by the coils of the respectively corresponding pairs. Then, assuming that the reversing switches are successively set in proper position during successive connections of the coils of the different pairs, a negative or zero reading of the wattmeter will indicate that no unbalance correction should be made at the correction point corresponding to the coil pair which gives either such reading. If, for example, the reading of the wattmeter with one of the coils 28b, 28e connected is negative, such negative reading would determine the unbalance as being in one of the other of the axial planes PL2 or PL3. Then if the coil pairs corresponding to PL2 and PL3 were tested one or the other would be found to give the positive reading indicating where the correction should be made, and the amount of correction required could then be measured, in this instance with either coil of the corresponding pair since the coils are equally spaced from the correction point with which the unbalance has been assumed, for preliminary purposes, to angularly coincide.

It will be noted that the method just described differs from the previously described unbalance determining method in that it selects the angular position for corrections by what may be termed a process of elimination, which is coupled or combined with the simultaneous determination of the amount of correction. As thus far described the method is limited to unbalances which are located in the same axial plane as is one of the plurality of available correction points, but the method can be extended to provide for any angular position of the unbalance, as follows:

If, for example, an unbalance WLX, Fig. 2, lies angularly between the axial correction planes WL1 and WL2 such unbalance may be corrected by suitably proportioned components of correction applied respectively at the correction points WL1 and WL2. Moreover the exact component of correction which must be made at the respective correction points may be measured in the device of Fig. 1 by using a measuring coil of the corresponding correction point. In the example cited all of the coils of both the sets 28e, 28b and 28e2, 28b2 will effect a positive or zero reading of the wattmeter 25 but, due to the difference in angular position of the coils relative to the vibration set up by the unbalance WLX, one of the coils of each set will effect a larger reading than the other, and it is such larger reading which is the measure of the correction component to be applied to the corresponding correction point. The components of correction to be applied to, at most, two of the three correction points may similarly be determined for an unbalance having any angular position.

For effecting measurements by the method of elimination as described the six-coil generator obviously will remain in fixed angular position. It is necessary however to provide for correction at any of the three angularly spaced correction points, preferably by providing a correction device having three correction tools operating at fixed angles corresponding to the spacing of the correction points. Work pieces for which the unbalance has been measured may then be properly located in the correction device by utilizing the marking or configuration previously referred to, and the exact correction of unbalance will be effected upon operation of the correction tools to the extent determined by the measuring device, as described, for the necessary two correction points required for the balancing.

It is obvious that the described balancing methods apply similarly where correction is required in two axially spaced correction planes such as the planes PL, PR, Fig. 1, using for the different planes respectively the corresponding pick-up coils CL, CR and the L, R circuits. The same six-coil generator may be used for both circuits.

However, for corrections in either one or more planes such as PL, PR, Fig. 1, it is necessary to provide additional contacts for the switch 29, for selective use as described of any of the six generator coils and, in order that all wattmeter readings may be of corresponding calibration, it is necessary either to make each of the six generator coils of like electrical effect or to provide individual calibration potentiometers therefor, such as the potentiometers 27L, 27R, together with additional contacts for the switch 26 to make the different potentiometers selectively operable. If it is desired to use measuring potentiometers such as 30L, 30R to supplement the measurements obtained by wattmeter readings, as previously described, then, in order to be convenient and fully effective, each correction plane such as PL, PR will require a potentiometer for each of the three sets of the generator measuring coils, that is to say, in this instance, six separate measuring potentiometers respectively for the three measuring points in each of the two correction planes.

Figure 3:
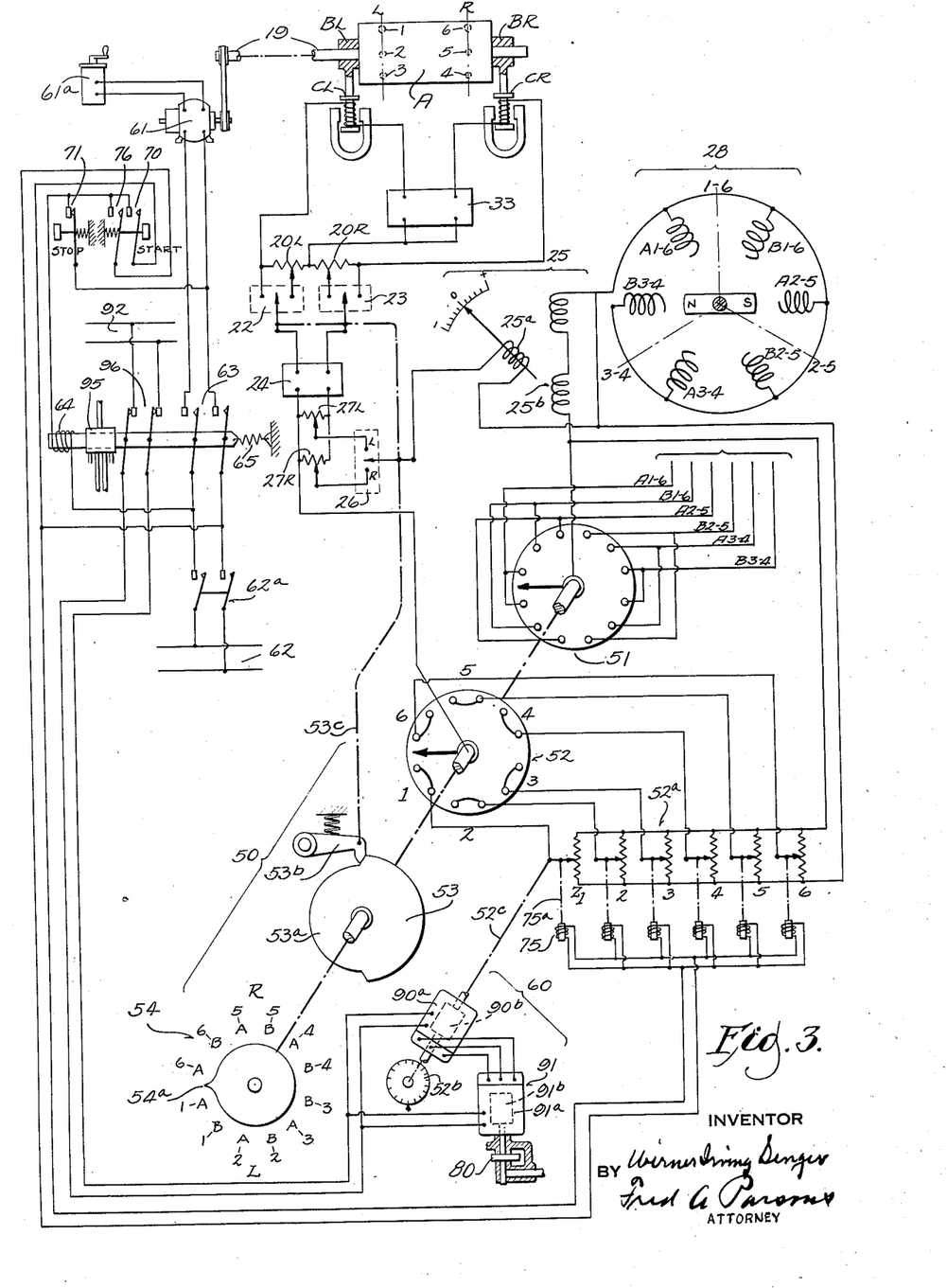
Figures 3 and 4 are collectively a diagrammatic representation of a machine incorporating the invention and operative for both measurement and correction of unbalance.
Figure 4:
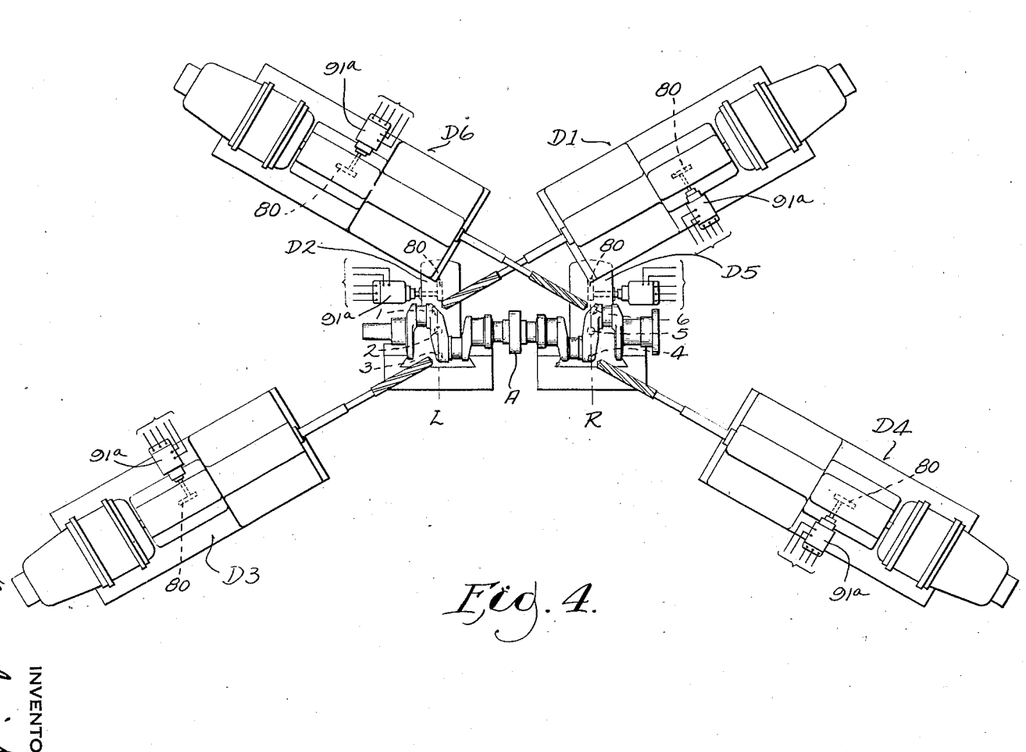

Figs. 3 and 4, taken together show a mechanism including an unbalance determining device operating in the manner and method described, together with an unbalance correction device operatively interconnected therewith for automatic adjustment of the correction device in accordance with measurement effected in the determining device, and also for intermutual control of cycles of operation of the two devices.

Referring to Fig. 3 the work piece A is a diagrammatic representation of a crank shaft shown in Fig. 4, in which equi-angularly spaced correction points 1, 2, 3 are provided in a left-end correction plane L, and similar correction points 4, 5, 6 are provided in a right-end correction plane R. In Fig. 3 there is shown the work piece A supported in bearings BL, BR for measurement of unbalance, pick-up coils CL, CR, an amplifier 24, calibrating potentiometers 27L, 27R, a wattmeter 25 and a measuring generator 28 of the six-coil type of Fig. 2, all of which operate in the manner previously described in connection with the device of Fig. 1 as modified by use of the measuring generator of Fig. 2; but in this instance there is provided a master switch mechanism generally denoted as 50 for selectively effecting predetermined position combinations of various switch devices, including a switch device 51 for connecting the different coils of measuring generator 28 with the stationary coil 25b of the wattmeter, a switch device 52 for connecting different measuring potentiometers collectively designated as 52a, and a switch operating device 53 for operation of the L, R switches 22, 23, 26; the master switch 50 being manually operated by a position selector dial device 54.

For convenience it has been assumed that the correction point pairs 1—6, 2—5 and 3—4, Fig. 3, are respectively in the same axial planes in the work piece and that the resulting three axial planes are respectively associated for unbalance measurements with different A—B coil pairs of the generator 28 as indicated by the correction plane and coil pair markings associated with the generator 28, Fig. 3.

The operative positions of the position selector device 54 include six positions forming a group L, which is used for measurements involving the correction plane L of work piece A; and another six positions forming a group R, which is used for measurements in the correction plane R. In any L group position of the selector indicator pointer 54a a cam 53a of the switch device 53 operates a cam follower lever 53b to shift all of the switches 22, 23, 26 to L position through a connection 53c, and similarly operates to shift the switches to R position when the indicator pointer is in any R group position.

The one end of each of the six generator coils, Fig. 3, is permanently connected to one end of the wattmeter coil 25b as shown. In the six L group positions of pointer 54a the other ends of the generator coils are connected one at a time to the other end of wattmeter coil 25b, whereby the six L positions collectively effect the six generator coil connections, previously referred to, required for the elimination of some of the L unbalance correction points 1, 2 or 3, and for determination of the unbalance correction required at the other points. Similarly the six R group positions of the selector point 54a effect the six coil connections for the correction points 4, 5, 6. The markings of the selector device 54 indicate the correction point and generator coil to which the position refers. Thus the position marked A—1 indicates that the measurement will be effected for coil A of the coil pair used for the axial correction plane 1—6, but further indicates that the L, R switches 22, 23 and 26 have eliminated the correction point 6, which is an R correction, whereby the measurement is for the correction point 1.

In order to supplement, as previously described, the measurements obtained by wattmeter readings, the several measuring potentiometers 52a provide an individual potentiometer for each correction point, as indicated by the numerals applied to the different potentiometers, Fig. 3; and in each position of the selector pointer 54a the switch 52 operates to connect, into the circuit of the movable coil 25a of the wattmeter, the measuring potentiometer corresponding to the correction point indicated by the pointer. Thus, for example, the measuring potentiometer 1 is connected in either of the two positions A1 or B1 of pointer 54a which are used for measurements referred to the correction point 1, etc.

Associated with each of the six potentiometers 52a there is an individually operable manual adjustment dial, such as 52b, Fig. 3. It will be understood that although, for simplicity, only one dial 52b is shown, there is for each potentiometer a similar dial similarly connected, as by a connection 52c, each dial having associated therewith a position copying device such as 60, later described.

The work piece A, Fig. 3, may be rotated by a motor 61 at a speed determined by a controller 61a. Motor 61 is driven from a line 62 through a line switch 62a and a switch 63 which may be closed by a solenoid 64 against the resistance of a spring 65. A start-stop device includes a normally open push-button start switch 70 which, when manually held closed, energizes solenoid 64 from line 62 whereby to close switch 63 to start the motor, thereby also completing a holding circuit energizing the solenoid through a circuit including switch 63 and a normally closed push-button stop swtich 71. The motor continues to run when switch 70 is released, but may be stopped by opening switch 71.

The several potentiometers 52a, Fig. 3, are each interconnected with the motor control switches to adjust the potentiometers to the zero position indicated as Z each time the motor 61 is started for rotation of the work piece A. For this purpose there is associated with each potentiometer a solenoid device such as 75 having an armature connected to the potentiometer as by a connection 75a. The several solenoids each receive current from the line 62 only through a control switch 76 associated with the push-button switch 70 to be similarly normally open. Whenever switch 70 is temporarily manually closed to start motor 61, as described, the switch 76 is also closed to operate the solenoids 75 to effect the zero potentiometer positions, but the solenoids are deenergized to permit adjustment of the potentiometers as soon as the motor starting push-button is released.

The motor 61 having been started and the potentiometers 52a all returned to zero position, as described, unbalance determination for the work piece A, Fig. 3, may proceed as follows:

For determination of unbalance corrections required in the correction plane L the selector pointer 54a is successively adjusted to positions marked 1, 2 and 3. Since the corrections will not be required at more than two of the correction points in the L correction plane, as previously explained, the pointer positions corresponding to one of the correction points will result in a negative reading of the wattmeter 25, it being understood that the device of Fig. 3 is arranged for only positive readings to indicate required corrections, as has been explained for the device of Fig. 1. The negative readings having eliminated one of the correction points, as correction point 3 for example, the correction required at point 2 may be determined by the larger of the two readings obtained respectively in the 2A, 2B pointer positions, and similarly for the correction point 1. All pointer positions for the correction plane L have now been eliminated from consideration except two, and for these two positions the correction to be made at the corresponding correction point is determined by the wattmeter reading, as described.

Similarly operating the selector pointer 54a in the group of R positions will result in eliminating all but two wattmeter readings for the correction points 4, 5, 6, and in determination of the amount of unbalance correction required at the remaining two of such points.

The four determinative wattmeter readings might be recorded, and corrections subsequently made at the corresponding points in the work piece according to such readings in any suitable manner, but in the machine of Figs. 3, 4, it is intended that in each instance, while the indicator pointer is in the position effecting the different correction determinative readings, the corresponding measuring potentiometers 52a will be adjusted to a position effecting a zero wattmeter reading, whereby at the conclusion of the measuring operation four of the potentiometers, corresponding to the four correction points at which the correction is to be made, stand respectively adjusted to a position corresponding to the amount of the correction required.

The measuring operation being concluded as described the motor 61 is stopped, and the work piece just measured is transferred to the correction device shown in Fig. 4. The correction device includes six driller units D1, D2, D3, D4, D5, D6, the drills of which respectively operate at the different correspondingly numbered correction points on the work piece; the work piece being rigidly fixed in a suitable holding fixture, not shown, in which it is angularly located as by markings or configurations, as previously explained.

Each of the driller units is of similar construction and operation, corresponding to the driller units fully shown and described in the copending application referred to, and the units therefore will not here be described in detail. The driller units each include a rotatable stop or gauge indicated at 80, Figs. 3, 4, the rotary adjustment of these stops determining for each driller unit the unbalance correction effected thereby. The respective cams are each automatically adjusted in accordance with the adjustment of the corresponding measuring potentiometers 52a, Fig. 3, for the corresponding correction point, the copying devices 60 being operative for such result in a manner described in said copending application. Briefly, the copying devices for each potentiometer are, in this instance, of an electrical type, each device including a controller unit such as 90, Fig. 3, and a copying unit such as 91. The several controller units each include a stator such as 90a and a rotor such as 90b, the rotors 90b being connected to be positioned in accordance with the adjustment of the associated potentiometer. Each copying unit includes a stator such as 91a and a rotor such as 91b, the rotors 91b being connected to the respective stop cams 80 of the corresponding driller units. When the stators such as 90a, 91a are energized from a suitable power line, such as 92, Fig. 3, the copying rotors 91b will move to an angular position corresponding to that of the control rotors 90b, whereby to adjust the driller stop gauges 80 according to the potentiometer settings. It will be understood that the stops 80 are so configurated that, for any driller unit where the corresponding potentiometer 52a is in zero position Z, the drill will not contact the work piece.

In the present machine the measured work piece having been transferred as described from the measuring device of Fig. 3 to the correction device of Fig. 4, another work piece is placed in the measuring device and the measuring operation proceeds for the new work piece in the manner previously described. The driller devices are each constructed and controlled to effect a cycle of hydraulic actuated automatic forward and reverse movement, the forward movement being controlled by the stops 80 as stated. The driller units are each interconnected with the measuring device for starting the cycle of correction movement when the switch 63, Fig. 3, is closed for starting the motor 61, whereby the correction of each of a series of measured work pieces automatically proceeds during the measurement of the work piece next to be corrected. For such result the automatic driller cycles are initiated by a hydraulic control valve 95 connected for operation upon the closing of motor switch 63; and a switch 96, connected to be closed only when motor switch 63 is open, controls the energizing of the stators 90a and 91a of the copying devices 60 to prevent operation of the copying devices during the measuring operation, but since both these or similar mutual control interconnections have been fully described in said copending application they will not here be further described.

It will be understood that, although two correction planes in the work piece have been referred to in describing the device of Figs. 3 and 4a, the invention may be used for only one correction plane, with corresponding advantage where it is unnecessary to correct the unbalance in two axially spaced correction planes. Moreover, whether one or two correction planes are used, it is not necessary for the three correction points to be equi-angularly spaced, since a correction of unbalance may be made at any two correction points in the manner described provided that the angular spacing does not exceed a practical limit of about 150 to 160 degrees.

Moreover, for one or both of the correction planes L, R, Fig. 3, there may be substituted a plurality of correction planes, measurements and correction being effected in each plane similarly to the manner described.

Further, the correction points respectively at opposite ends of the work piece, forming pairs shown in Fig. 3 as being in the same axial plane, are not limited to such mutual axial planes for the practice of the method described. If the work piece requires such expedients, the correction points respectively at opposite ends of the work piece may have any relative angular spacing in the practice of the invention.

What is claimed is:

1. A method of balancing work pieces about an intended rotation axis thereof which includes measuring for amount of unbalance at at least three predetermined correction points angularly spaced apart about said axis, and selectively utilizing for the unbalance correction only some of said measurements in accordance with the positive or negative value thereof.

2. A method of balancing work pieces about an intended rotation axis thereof which includes measuring while the work piece is rotating on said axis for amount of unbalance at at least three predetermined correction points angularly spaced apart about said axis and selectively utilizing for the unbalance correction only some of said measurements in accordance with the positive or negative value thereof.

3. A method of balancing work pieces about an intended rotation axis thereof which includes measuring for amount of unbalance at at least three predetermined correction points angularly spaced apart about said axis and selectively rejecting some of said measurements in accordance with the positive or negative value thereof, and further selectively rejecting some of said measurements in accordance with the relative value thereof, and utilizing for the unbalance correction only the remaining measurements.

4. A method of balancing work pieces about an intended rotation axis thereof which includes measuring while the work piece is rotating for amount of unbalance at at least two groups of predetermined correction points each including three correction points angularly spaced apart about said axis and selectively rejecting some of said measurements in accordance with the positive or negative value thereof, and further selectively rejecting some of said measurements in accordance with the relative value thereof, and utilizing for the unbalance correction only the remaining measurements.

5. In a machine for determination of unbalance correction required about a rotation axis of a work piece, the combination of a first alternating current generator device furnishing current in predetermined phase angle relationship to the angular position of the unbalance about said axis and of value proportional to the unbalance effect while the work piece is being rotated, a second alternating current generator device furnishing at least three pairs of currents, the currents of the pairs being in predetermined phase angle relationship respectively to different predetermined correction points angularly spaced about said axis, an indicator device including a plurality of coils, connector means for applying to one of the coils of said indicator device alternating current of value, frequency and phase determined by said first generator, and connector means for selectively alternatively applying to another indicator device coil alternating currents respectively of a value, frequency and phase determined by the different currents of said second generator.

6. In a machine for determination of unbalance correction required about a rotation axis of a work piece, the combination of a first alternating current generator device furnishing current in predetermined phase angle relationship to the angular position of the unbalance about said axis and of value proportional to the unbalance effect while the work piece is being rotated, a second alternating current generator device furnishing at least three pairs of currents, the currents of the pairs being in predetermined phase angle relationship respectively to different predetermined correction points angularly spaced about said axis, an indicator device including a plurality of coils, connector means for applying to one of the coils of said indicator device alternating current of value, frequency and phase determined by said first generator, and connector means for selectively alternatively applying to another indicator device coil alternating currents respectively of a value, frequency and phase determined by the different currents of said second generator, said indicator device providing a zero response indicating position and indicator scales of both positive and negative response values.

7. In a machine for determination of unbalance correction required about a rotation axis of a work piece, the combination of a first alternating current generator device furnishing current in predetermined phase angle relationship to the angular position of the unbalance about said axis and of value proportional to the unbalance effect while the work piece is being rotated, a second alternating current generator device furnishing at least three pairs of currents, the currents of the pairs being in predetermined phase angle relationship respectively to different predetermined correction points angularly spaced about said axis, an indicator device including a plurality of coils, connector means for applying to one of the coils of said indicator device alternating current of value, frequency and phase determined by said first generator, connector means for selectively alternatively applying to another indicator device coil alternating currents respectively of a value, frequency and phase determined by the different currents of said second generator, and a measuring device including a plurality of adjustable potentiometers selectively alternatively operable to apply in the circuit of one of said indicator device coils a current of phase and frequency determined by the generator current which determines the current in the other indicator device coil.

8. In a machine for correction of unbalance about an intended rotation axis of a work piece the combination of a first alternating current generator device furnishing current in predetermined phase angle relationship to the angular position of the unbalance about said axis and of value proportional to the unbalance effect while the work piece is being rotated, a second alternating current generator device furnishing at least three pairs of currents, the currents of the pairs each being in predetermined phase angle relationship respectively to three predetermined correction points angularly spaced about said axis, an indicator device including a plurality of coils, connector means for applying to one of the coils of said indicator device alternating current of value, frequency and phase determined by said first generator, connector means for selectively alternatively applying to another indicator device coil alternating currents respectively of a value, frequency and phase determined by the different currents of said second generator, and a plurality of correction devices collectively operable at all of said correction points on the work piece and respectively operable at different of said points.

9. In a machine for determination of unbalance correction required about a rotation axis of a work piece, the combination of a first alternating current generator device furnishing current in predetermined phase angle relationship to the angular position of the unbalance about said axis and of value proportional to the unbalance effect while the work piece is being rotated, a second alternating current generator device furnishing at least three pairs of currents, the currents of the pairs being in predetermined phase angle relationship respectively to different predetermined correction points angularly spaced about said axis, an indicator device including a plurality of coils, connector means for applying to one of the coils of said indicator device alternating current of value, frequency and phase determined by said first generator, and connector means for selectively alternatively applying to another indicator device coil alternating currents respectively of a value, frequency and phase determined by the different currents of said second generator, a measuring device including a plurality of adjustable potentiometers selectively alternatively operable to apply in the circuit of one of said indicator device coils a current of phase and frequency determined by the generator current which determines the current in the other indicator device coil, interruptible power transmission for said rotation of the work piece, control means for said transmission including a member shiftable to a rotation starting position, shifter means for adjustment of each of said potentiometers to a position of zero effect, and control means for said shifter means for effecting said zero effect position of said potentiometers upon the shifting of said member to its rotation starting position.

10. In a machine for determination of unbalance correction required about a rotation axis of a work piece, the combination of a first alternating current generator device furnishing current in predetermined phase angle relationship to the angular position of the unbalance about said axis and of value proportional to the unbalance effect while the work piece is being rotated, a second alternating current generator device furnishing at least three pairs of currents, the currents of the respective pairs being in predetermined phase angle relationship respectively to different predetermined correction points angularly spaced about said axis, an indicator device including a plurality of coils, connector means for applying to one of the coils of said indicator device alternating current of value, frequency and phase determined by said first generator, connector means for selectively alternatively applying to another indicator device coil alternating currents respectively of a value, frequency and phase determined by the different currents of said second generator, a measuring device including a plurality of adjustable potentiometers selectively alternatively operable to apply in the circuit of one of said indicator device coils a current of phase and frequency determined by the generator current which determines the current in the other indicator device coil, an electric motor for said rotation of the work piece, a controller for said motor including a start switch continuously urged to open position, shifter means for adjustment of each of said potentiometers to a position of zero effect, and control means for operation of said shifter means when said start switch is shifted to a closed position.

11. In a machine for correction of unbalance about an intended rotation axis of a work piece the combination of a first alternating current generator device furnishing current in predetermined phase angle relationship to the angular position of the unbalance about said axis and of value proportional to the unbalance effect while the work piece is being rotated, a second alternating current generator device furnishing at least three pairs of currents, the currents of the pairs each being in predetermined phase angle relationship respectively to three predetermined correction points angularly spaced about said axis, an indicator device including a plurality of coils, connector means for applying to one of the coils of said indicator device alternating current of value, frequency and phase determined by said first generator, connector means for selectively alternatively applying to the other indicator device coil alternating currents respectively of a value, frequency and phase determined by the different currents of said second generator, a measuring device including a plurality of adjustable potentiometers selectively alternatively operable to apply in the circuit of one of said indicator device coils a current of phase and frequency determined by the generator current which determines the current in the other indicator device coil, a plurality of correction devices collectively operable at all of said correction points on the work piece and respectively operable at different of said points, each of said correction devices including a member adjustable for determining the amount of the correction effected by the device, and a plurality of connections respectively for adjustment of the different correction device members in automatic accordance with the adjustment of different of said potentiometers.

12. In a machine for determination of unbalance correction required about a rotation axis of a work piece, the combination of a first alternating current generator device furnishing current in predetermined phase angle relationship to the angular position of the unbalance about said axis and of value proportional to the unbalance effect while the work piece is being rotated, a second alternating current generator device furnishing at least three pairs of currents, the currents of the respective pairs being in predetermined phase angle relationship respectively to different predetermined correction points angularly spaced about said axis, an indicator device including a plurality of coils, connector means for applying to one of the coils of said indicator device alternating current of value, frequency and phase determined by said first generator, connector means for selectively alternatively applying to another indicator device coil alternating currents respectively of a value, frequency and phase determined by the different currents of said second generator, a measuring device including a plurality of adjustable potentiometers selectively alternatively operable to apply in the circuit of one of said indicator device coils a current of phase and frequency determined by the generator current which determines the current in the other indicator device coil, and a master connector device operable for operation of both said connector means and in each current connection effected thereby simultaneously operatively connecting one of said potentiometers and disconnecting the others thereof.

13. In a machine for determination of unbalance correction required about a rotation axis of a work piece, the combination of right and left alternating current generators respectively furnishing currents while the work piece is being rotated in predetermined phase angle relationship to the angular position about said axis of different unbalances respectively in different axial positions in the work piece, each of said generators furnishing current of value proportional to the effect of the corresponding unbalance, a third alternating current generator furnishing at least three pairs of currents, the currents of the pairs being in predetermined phase angle relationship respectively to different predetermined correction points angularly spaced about said axis, an indicator device including a plurality of coils, connector means for selectively alternatively applying to one of the coils of said indicator device alternating currents of value, frequency and phase determined by said right generator or by said left generator, and connector means for selctively alternatively applying to another indicator device coil alternating currents respectively of value, frequency and phase determined by the different currents of said third generator.

14. In a machine for determination of unbalance correction, required about a rotation axis of a work piece, the combination of right and left alternating current generators respectively furnishing currents while the work piece is being rotated in predetermined phase angle relationship to the angular position about said axis of different unbalances respectively in different axial positions in the work piece, each of said generators furnishing current of value proportional to the effect of the corresponding unbalance, a third alternating current generator furnishing at least three pairs of currents, the currents of the respective pairs each being in predetermined phase angle relationship respectively to different predetermined correction points angularly spaced about said axis, an indicator device including a plurality of coils, connector means for selectively alternatively applying to one of the coils of said indicator device alternating currents of value, frequency and phase determined by said right generator or by said left generator, connector means for selectively alternatively applying to another indicator device coil alternating currents respectively of value, frequency and phase determined by the different currents of said third generator, and a measuring device including a plurality of adjustable potentiometers selectively alternatively operable to apply in the circuit of one of said indicator device coils a current of phase and frequency determined by the generator current which determines the current in the other indicator coil.

15. In a machine for determination of unbalance correction required about a rotation axis of a work piece, the combination of right and left alternating current generators respectively furnishing currents while the work piece is being rotated in predetermined phase angle relationship to the angular position about said axis of different unbalances respectively in different axial positions in the work piece, each of said generators furnishing current of value proportional to the effect of the corresponding unbalance, a third alternating current generator furnishing at least three pairs of currents, the currents of the pairs each being in predetermined phase angle relationship respectively to different predetermined correction points angularly spaced about said axis, an indicator device including a plurality of coils, connector means for selectively alternatively applying to one of the coils of said indicator device alternating currents of value, frequency and phase determined by said right generator or by said left generator, connector means for selectively alternatively applying to another indicator device coil alternating currents respectively of value, frequency and phase determined by the different currents of said third generator, and a master connector device operable for operation of both of said connector means for effecting a plurality of position combinations thereof.

16. In a machine for determination of unbalance correction required about a rotation axis of a work piece, the combination of right and left alternating current generators respectively furnishing currents while the work piece is being rotated in predetermined phase angle relationship to the angular position about said axis of different unbalances respectively in different axial positions in the work piece, each of said generators furnishing current of value proportional to the effect of the corresponding unbalance, a third alternating current generator furnishing at least three pairs of currents, the currents of the pairs each being in predetermined phase angle relationship respectively to different predetermined correction points angularly spaced about said axis, an indicator device including a plurality of coils, connector means for selectively alternatively applying to one of the coils of said indicator device alternating currents of value, frequency and phase determined by said right generator or by said left generator, connector means for selectively alternatively applying to another indicator device coil alternating currents respectively of value, frequency and phase determined by the different currents of said third generator, a measuring device including a plurality of adjustable potentiometers selectively alternatively operable to apply in the circuit of one of said indicator device coils a current of phase and frequency determined by the generator current which determines the current in the other indicator coil, and a master connector device operable for operation of both of said connector means and in each connection combination effected thereby simultaneously operatively connecting one of said potentiometers and disconnecting the others thereof.

WERNER IRVING SENGER.